United States Patent [19]

Burns et al.

[11] Patent Number: 5,112,779
[45] Date of Patent: May 12, 1992

[54] HIGH DENSITY SILICON CARBIDE SINTERED BODIES FROM BOROSILOXANES

[75] Inventors: Gary T. Burns; Gregg A. Zank, both of Midland, Mich.

[73] Assignee: Dow Corning Corporation, Midland, Mich.

[21] Appl. No.: 674,005

[22] Filed: Mar. 25, 1991

Related U.S. Application Data

[63] Continuation of Ser. No. 458,204, Dec. 28, 1989, abandoned.

[51] Int. Cl.$^5$ .............................................. C04B 35/54
[52] U.S. Cl. ...................................... 501/90; 501/88; 501/92; 501/93; 501/96
[58] Field of Search ...................... 501/88, 90, 92, 93, 501/96; 423/344, 345

[56] References Cited

U.S. PATENT DOCUMENTS

| | | | |
|---|---|---|---|
| 4,267,210 | 5/1981 | Yajima et al. | 427/226 |
| 4,267,211 | 5/1981 | Yajima et al. | 427/228 |
| 4,604,367 | 8/1986 | Takamizawa et al. | 501/95 |
| 4,618,591 | 10/1986 | Okamura et al. | 501/90 |
| 4,735,858 | 4/1988 | Hosokawa et al. | 428/390 |
| 4,851,491 | 7/1989 | Riccitiello et al. | 528/4 |
| 4,888,376 | 12/1989 | Atwell et al. | 524/401 |

*Primary Examiner*—William R. Dixon, Jr.
*Assistant Examiner*—Alan Wright
*Attorney, Agent, or Firm*—Roger E. Gobrogge

[57] ABSTRACT

This invention relates to the preparation of highly densified ceramic bodies by the pyrolysis of a mixture comprising a preceramic borosiloxane, silicon carbide powder, a curing agent for the borosiloxane, a crosslinking agent for the borosiloxane and, optionally, additional components to facilitate sintering. Such highly densified ceramic bodies can be prepared by sintering under pressure or by a pressureless sintering process.

31 Claims, No Drawings

HIGH DENSITY SILICON CARBIDE SINTERED BODIES FROM BOROSILOXANES

This is a continuation of copending application Ser. No. 07/458,204 filed on Dec. 28, 1989, now abandoned.

BACKGROUND OF THE INVENTION

This invention relates to the preparation of highly densified ceramic bodies by the pyrolysis of a mixture comprising a preceramic borosiloxane, silicon carbide powder, a curing agent for the borosiloxane and, optionally, a crosslinking agent for the borosiloxane and/or additional components to facilitate sintering. Such highly densified ceramic bodies can be prepared by sintering under pressure or by utilizing a pressureless process.

This invention also relates to novel mixtures comprising a preceramic borosiloxane, silicon carbide powder, a curing agent for the borosiloxane and, optionally, a crosslinking agent for the borosiloxane and/or additional components to facilitate sintering. These mixtures can be formed into desired shapes and then sintered to form ceramic, shaped bodies with high densities.

The products and processes of the present invention have several distinct advantages over prior art methods. First, the green bodies have high strengths, thus, facilitating handling and machining before sintering. Secondly, the use of a borosiloxane often eliminates the need to include additional sintering aids (e.g. boron or aluminum) and/or carbon sources into the preceramic mixture since both may be incorporated into the polymeric structure of said borosiloxane. Finally, the composition of the preceramic mixture can be varied to accommodate various molding techniques such as press and sinter or transfer/injection molding and sinter applications.

Prockazka in U.S. Pat. Nos. 4,004,934 and 4,041,117 and Prockazka et al. in U.S. Pat. No. 4,081,284 describe high density silicon carbide ceramic bodies prepared in a pressureless sintering process. Such ceramic bodies were prepared from mixtures consisting of silicon carbide powder, a boron-containing additive, and a carbonaceous additive. The carbonaceous additives or binders are high molecular weight, carbon-based aromatic compounds such as phenol-formaldehyde condensate-novolak, resorcinol-formaldehyde, aniline-formaldehyde, cresol-formaldehyde, derivatives of polynuclear aromatic hydrocarbon compounds contained in coal tar, polyphenylene, polymethylphenylene, and the like. Ceramic silicon carbide materials with greater than 85% of theoretical density were obtained.

Onda et al. in Japanese Kokai Patent 60-16869 describe a method of preparing high density silicon carbide ceramics which involves pressureless sintering of a mixture consisting of silicon carbide powder, an auxiliary sintering aid, and an organosilicon polymer characterized by a Si—C skeletal structure. Disclosed sintering aids include boron, aluminum, and beryllium containing compounds. The organosilicon polymers were described as "high-molecular-weight organic silicon-containing compounds with silicon-carbon skeletal structures." The organosilicon polymers were not further identified even in the examples. Based on this limited description it appears likely that the organosilicon polymers were polycarbosilanes which have a Si—C skeletal backbone.

Yajima et al. reported the formation of silicon carbide sintered bodies from borosiloxanes in Nature, vol. 266, pp 522-524. The process disclosed therein comprises blending a borosiloxane and silicon carbide powder in benzene, evaporating the solvent, mould pressing the mixture and sintering at a temperature up to 1700° C. This reference, however, does not achieve a high density product as the temperature utilized therein is less than 1900° C. Moreover, since the reference does not teach the use of a curing or crosslinking agent, green bodies formed thereby are generally not as strong as those formed by the process of the present invention.

Several inventors such as Tamamizu et al. in Japanese Kokai Patent 54-134744 and Yajima et al. in J. Am. Ceram Soc. Bull., Vol. 60, p 253 have reported the use of a mixture of silicon carbide powder and a borosiloxane polymer as a bonding agent. These references, however, as in Yajima et al. supra, do not achieve high density materials because of the temperature utilized, and generally do not form strong green bodies as a curing agent and cross-linking agent are not included.

In copending applications, Ser. Nos. 07/248,884, 07/249,036, 07/265,988 and 07/268,398 in the names of Atwell et al. or Burns et al. and assigned to the same assignee hereof, there are disclosed methods of producing high density silicon carbide sintered bodies by forming a mixture of polysilazanes, polysilanes or polysiloxanes, metal-containing sintering aids, optional curing agents and silicon carbide powders into green bodies and then sintering them in an inert atmosphere at temperatures in excess of 1900° C.

The present application discloses for the first time that high density, high strength ceramic products may unexpectedly be obtained by sintering a mixture comprising a preceramic borosiloxane, silicon carbide powder, a curing agent for the borosiloxane and, optionally, a crosslinking agent for the borosiloxane and/or additional components to facilitate sintering.

SUMMARY OF THE INVENTION

The present invention relates to a method of preparing a handleable green body. The method comprises blending silicon carbide powder, a preceramic borosiloxane, a curing agent for the borosiloxane and, optionally, a crosslinking agent for the borosiloxane and/or additional components to facilitate sintering. The amount of curing agent present in said mixture is an effective amount to cure the borosiloxane. The amount of the preceramic borosiloxane present in said mixture is such that (a) the amount of boron is 0.08-3 weight percent based on the total weight of the silicon carbide powder and the char derived from the preceramic borosiloxane and (b) the free carbon value of the mixture is greater than 0.1 weight percent based on the total weight of the silicon carbide powder and the char derived from the preceramic borosiloxane. The amount of crosslinking agent, if present, is an amount effective to crosslink the borosiloxane. Additional components to facilitate sintering may also be added to the mixture in an effective amount. The mixture is then formed into the desired shape under pressure at a temperature less than about 500° C. to obtain said handleable green body.

The present invention also relates to a method of preparing a sintered body of silicon carbide. The method comprises sintering the handleable green body formed above in an inert atmosphere at a temperature greater than 1900° C. to obtain said sintered body which has a density greater than 2.4 g/cm$^3$.

The present invention additionally relates to a uniform mixture comprising silicon carbide powder, a preceramic borosiloxane, a curing agent for the borosiloxane and, optionally, a crosslinking agent for the borosiloxane and/or additional components to facilitate sintering. The amount of curing agent present in said mixture is an effective amount to cure the borosiloxane. The amount of the preceramic borosiloxane present in said mixture is such that (a) the amount of boron is 0.08-3 weight percent based on the total weight of silicon carbide powder and the char derived from the preceramic borosiloxane and (b) the free carbon value of the mixture is greater than 0.1 weight percent based on the total weight of the silicon carbide powder and the char derived from the preceramic borosiloxane. The amount of crosslinking agent, if present, is an amount effective to crosslink the borosiloxane. Additional components to facilitate sintering may also be added in an effective amount.

DETAILED DESCRIPTION OF THE INVENTION

The present invention relates to the preparation of highly densified sintered bodies from preceramic borosiloxane polymers, silicon carbide powder, a curing agent for the borosiloxane and, optionally, a crosslinking agent for the borosiloxane and/or additional components to facilitate sintering. The sintered bodies produced from the practice of this invention have densities greater than about 2.4 g/cm$^3$ which corresponds to about 75% of the theoretical density of silicon carbide (3.21 g/cm$^3$). Such highly densified bodies are useful as light weight refractory ceramics.

The novel compositions of the invention can also be used to prepare handleable green bodies. By "handleable green bodies" we mean green bodies which have sufficient green strength to be handled or machined to a desired shape prior to sintering. Generally, green strengths of 500 psi or more may be obtained in the practice of this invention.

The green bodies may be formed by conventional techniques known in the art. Such methods include pressure molding, uniaxial pressing, isopressing, extrusion, transfer molding, injection molding, and the like. The present invention is particularly advantageous in this respect since the composition of the preceramic mixture can easily be changed to accommodate the use of multiple molding techniques without affecting the quality of the sintered product.

Because the preceramic mixture includes a borosiloxane, green bodies formed by the above techniques are generally strong enough to be handled or further shaped by methods such as machining, milling etc. This not only alleviates the problems associated with handling fragile objects, but it allows for the production of more complex shapes through flexibility in product design.

The shaped green bodies are then fired to an elevated temperature under an inert atmosphere to convert them into ceramic articles having densities greater than about 75% of theoretical. It is preferred that the density of the ceramic article be greater than about 85% of theoretical (2.7 g/cm$^3$). It is more preferred that the density be greater than about 2.9 g/cm$^3$ (90% of theoretical); it is most preferred that the density be greater than about 3.05 g/cm$^3$ (95% of theoretical).

Upon pyrolysis, the borosiloxanes of this invention yield both SiC and free carbon. This factor tends to decrease the amount of shrinkage that occurs when the mixture is sintered, especially when compared with prior art such as Prockazka '934 supra in which the binders pyrolyze to entirely free carbon. Because less shrinkage occurs, sintered objects with increased tolerance control can be formed.

The compositions of this invention may be sintered either under pressure or by using a pressureless process to produce a highly densified ceramic article. Since the sintering process employing pressure will generally produce ceramic articles with higher density, such a method would be preferred if maximum density were desired. Generally, however, the pressureless sintering process is preferred because of the simplified operations involved.

Inert atmospheres are used for sintering to prevent oxygen incorporation and silica formation. The sintering process as well as the density of the sintered product are thereby enhanced. For purposes of this invention, an inert atmosphere is meant to include an inert gas, vacuum or both. If an inert gas is used it may be, for example, argon, helium or nitrogen. If a vacuum is used it may be, for example, in the range of 0.1-200 torr, preferably 0.1-0.3 torr. Exemplary of a combined process might be firing the composition in argon up to 1150° C., firing from 1150° to 1575° C. in a vacuum and firing from 1575° to 2070° C. under argon.

In addition to the above advantages of an inert atmosphere, the use of nitrogen during sintering can reduce the conversion of beta-SiC to alpha-SiC grains. The inhibition of this conversion is seen as a particular advantage in ceramic formation since large alpha-SiC grains prevent ultimate densification and, thus, may be the site of a flaw in the ceramic product. However, since the use of nitrogen decreases the rate of sintering, increased firing temperatures are often necessary.

Sintering may be performed in any conventional high temperature furnace equipped with a means to control the furnace atmosphere. Temperatures of about 1900° C. or higher are generally used with the preferred range being about 1950°-2200° C. The most preferred sintering temperature is about 2070° C. Though lower temperatures can be used, the ceramic product may not possess the desired density.

The temperature schedule for sintering depends on both the volume of parts to be fired and the composition of the mixture. For smaller objects the temperature may be elevated relatively rapidly. For larger objects or those with large concentrations of the borosiloxane, however, more extended programs are needed to create uniform ceramic bodies.

The borosiloxanes useful in this invention are generally well known in the art. Those selected must be capable of being converted to ceramic materials with a significant ceramic char yield, generally greater than about 20 weight percent. However, since the char yield is inversely related to the shrinkage of the ceramic during firing, those with higher yields, such as greater than about 30 weight percent, are preferred.

The borosiloxanes utilized in the invention also generally yield a ceramic char containing free carbon. Borosiloxanes in which the ceramic char contains at least 10 weight percent free carbon are preferred and those containing at least 30 weight percent are more preferred.

So long as the borosiloxane can be converted to a ceramic char with sufficient char yield and free carbon as described above, its structure is not critical. The borosiloxane may contain units of general structure [R$_3$SiO$_{0.5}$], [R$_2$SiO], [RSiO$_{1.5}$], [BO$_{1.5}$], [RBO], [R$_2$BO$_{0.5}$] and [SiO$_2$] where each R is independently selected from the group consisting of hydrogen, alkyl radicals containing 1 to 20 carbon atoms such as methyl, ethyl, propyl etc., phenyl radicals, and vinyl radicals. Generally, borosiloxanes which contain phenyl groups are preferred as such groups easily allow for the formation of ceramic chars with sufficient free carbon. Borosiloxanes which contain vinyl groups are also preferred since vinyl groups attached to silicon provide a mechanism whereby the borosiloxane can be cured prior to sintering. Borosiloxanes where R is almost exclusively methyl are generally not suitable for use in this invention as there is insufficient free carbon in the resulting ceramic char. Preferred borosiloxanes contain varying amounts of [PhSiO$_{1.5}$], [Me$_2$SiViO$_{0.5}$], [BO$_{1.5}$] and [Ph$_2$SiO] units, but other units such as [ViSiO$_{1.5}$], [PhMeSiO], [MeHSiO], [MeViSiO], [Ph$_2$SiO], [Me$_2$SiO], [Me$_3$SiO$_{0.5}$] and the like are also useful. Mixtures of borosiloxanes may also be employed herein.

The use of such borosiloxanes as binders for SiC powder is particularly advantageous over binders of the prior art since the substituents on the polymer can be changed to achieve the desired amount of free carbon and boron in the char. In this manner, the polymer can be tailored to obtain a polymer/SiC ratio in the preceramic mixture which is suitable for the molding application utilized and still have the appropriate free carbon in the char. If one were to use the polymeric carbon sources of Prockazka ('934) supra which result in a char consisting of 100% free carbon, for instance, increasing the polymer/SiC ratio of the preceramic mixture for a given molding technique would result in large carbon excesses, thus impeding the ultimate densification of the ceramic body.

The borosiloxanes of this invention can be prepared by techniques well known in the art. The preferred method, however, comprises copolymerizing either boric acid esters or boric acid with silicon alkoxides or siloxanes in the presence of trifluoromethylsulfonic acid or trifluoroacetic acid, water and heat. In a typical process, the boric acid ester/boric acid is added to a stirred mixture of silicon alkoxides/siloxanes, distilled water and acid. The reaction is refluxed for about 2–18 hours. The methanol and water thereby produced is then removed and the resin cooled. Toluene is then added and the solution is again refluxed (with water being removed) until clear. The resin is again cooled and Me$_2$ViSiCl (an endblocker) added. The solution is stirred for about 0.5–48 hours and then concentrated in vacuo to yield the polymer. The present inventors have discovered that the use of trifluoroacetic acid in the above reaction is preferred if vinyl groups are present since they are thereby more easily retained.

Such methods, as well as others, are described in U.S. Pat. Nos. 4,152,509 and 4,248,814 granted to Yajima et al. and No. 11, *Chemistry and Technology of Silicones*, chapter 5 (translated 2d Ger. Ed., Academic Press, 1968) which are all incorporated herein by reference in their entirety. Specific methods for preparation of suitable borosiloxanes are also illustrated in the examples included in the present application.

The preceramic borosiloxane is present in the compositions of the present invention at such a level that (a) the amount of boron is 0.08–3 weight percent and (b) the free carbon value of the mixture is greater than 0.1 weight percent, both based on the total weight of the silicon carbide powder and the char derived from the preceramic borosiloxane.

What is meant by "free carbon value of the mixture" in this invention is the amount of free or excess carbon derived from the borosiloxane during pyrolysis expressed as a weight percentage based on the total weight of the silicon carbide powder and the char derived from the borosiloxane. The total amount of carbon in the ceramic char equals the amount of free or excess carbon plus the amount of carbon in the form of silicon carbide.

The amount of boron and free carbon derived from the borosiloxane is determined by pyrolysis of the borosiloxane, the curing agent and, if present, the crosslinking agent, in the absence of any silicon carbide powder, to an elevated temperature under an inert atmosphere until a stable ceramic char is obtained. For purposes of this invention, a "stable ceramic char" is defined as the ceramic char produced at an elevated temperature which will not significantly decrease in weight upon further exposure at the elevated temperature. Normally, a stable ceramic char is produced upon pyrolysis at 1800° C. for about 30 minutes under argon. Other elevated temperatures can be used to form the stable ceramic char but the length of exposure to the elevated temperature will need to be increased for temperatures less than 1800° C.

Both the ceramic yield and the boron, silicon and carbon content of the stable ceramic char are then determined. Using a rule of mixtures, the amount of SiC and free carbon of the stable ceramic char can be calculated. The amount of free carbon thus calculated and the amount of boron are normally expressed as the amounts produced per gram of preceramic borosiloxane. Knowing the amount of boron and free carbon produced by pyrolysis of the borosiloxane, one can determine how much borosiloxane is required to obtain a borosiloxane/silicon carbide mixture with the desired amount of boron and the desired free carbon value. Naturally, if one is using the same or very similar borosiloxane to prepare a sintered body, it is not required that the amount of boron and free carbon produced per gram of borosiloxane be determined every time.

This procedure can perhaps be best illustrated by example. Assume a borosiloxane (100 g) which gives, upon pyrolysis to 1800° C., a char yield of 50 weight percent which contains 40 weight percent carbon, 55 weight percent silicon and 5 weight percent boron. Such a char contains 27.5 g (0.98 moles) silicon and 2.5 g boron. Using a rule of mixtures, the char also contains 0.98 moles (11.8 g) of carbon in the form of SiC. Since the char contains 20 g carbon, the amount of free carbon in the char is 8.2 g (20 g minus 11.8 g). Thus each gram of the preceramic borosiloxane yields 0.082 g free carbon and 0.025 g boron.

If the preceramic mixture is to contain 100 g of SiC, the following 2 equations are then used to calculate the amount of borosiloxane (x) to be added for a given free carbon value (FCV) or boron concentration ([B]):

$$FCV = \frac{(0.082x)}{(100 + 0.5x)} = 0.002 - 0.03 \ (0.1 - 3\%)$$

and:

$$[B] = \frac{(0.025x)}{(100 + 0.5x)} = 0.001 - 0.03 \ (0.08 - 3\%)$$

The numerator in the above equations represents the total amount of free carbon or boron produced by x g of borosiloxane. The denominator in the above equations represents the amount of silicon carbide (100 g) plus the char derived from x g of borosiloxane.

Since the polymer provides both the free carbon and the boron content of the char, an amount of polymer must be chosen which will satisfy both equations. If both equations cannot be satisfied with a given polymer, the structure can be changed to alter the char composition or additional free carbon and/or sintering aids can be added to the preceramic mixture.

Using this procedure, the amount of borosiloxane required to prepare the compositions of this invention can be determined. This procedure avoids the costly and time consuming trial and error method which might otherwise be required.

This seemingly complex process of determining the amount of borosiloxane to be added can be summarized in the following steps:

1) A known weight of the borosiloxane is pyrolyzed to stable char;
2) the char is weighed and the result expressed as a weight percent of the starting compound, i.e. the "char yield" of the borosiloxane;
3) The resultant char is analyzed for elemental content;
4) Using a rule of mixtures, the amount of "free carbon" in the char is calculated by subtracting the amount of carbon bound to silicon from the total carbon present. The resultant value is expressed as free carbon produced per gram of starting material. The amount of boron produced per gram of starting material is also calculated; and
5) The amount of borosiloxane (B) to be added for a given free carbon value or boron concentration is calculated using the following equations:

$$FCV = \frac{(FCB \times B)}{(SiC) + (CYB \times B)}$$

and $$[B] = \frac{(ABB \times B)}{(SiC) + (CYB \times B)}$$

Where FCB=grams of Free Carbon produced per gram of the Borosiloxane; B=grams of borosiloxane; ABB=Amount of Boron produced per gram of Borosiloxane; and CYB=Char Yield of the borosiloxane.

The free carbon value of the mixture must be greater than 0.1 weight percent based on the total weight of the silicon carbide powder and the char derived from the borosiloxane. For free carbon values less than about 0.1 weight percent the density of the sintered body will generally fall below about 2.4 g/cm$^3$ (75% of theoretical). It is generally preferred that the free carbon value of the mixture is greater than 0.5% with the resultant density of the sintered body being greater than about 85% of theoretical. It is more preferred that the free carbon value of the mixture be between 0.5 and 3.0 weight percent with a range of 1.0 to 2.0 weight percent being even more preferred. The optimum density is generally obtained when the free carbon value of the mixture is about 1.5 weight percent.

If the desired amount of free carbon can not be incorporated into the polymer, an additional source of carbon may be added. The procedure used for said incorporation is described and claimed in co-pending U.S. patent application Ser. No. 07/458,461, entitled "Multi-component Binders for SiC Powders" by inventors Gary Thomas Burns, Ronald Keller, Willard Hauth and Chandan Kumar Saha. The above described application is being filed on the same date as the application at hand and is incorporated herein by reference in its entirety.

Boron is necessary in the present invention to facilitate sintering. Generally, the amount of boron derived from the borosiloxane should be equivalent to about 0.08 to 3.0 weight percent based on the total weight of the silicon carbide powder and the char derived from the borosiloxane. Quantities less than this amount will inhibit proper sintering and larger quantities often result in products which do not have the desired density.

If the desired amount of boron cannot be incorporated into the polymer, additional components which facilitate sintering may be added to the mixture. These include iron, $Fe_3C$, magnesium, $MgC_3$, lithium, $Li_2C_2$, beryllium, $Be_2C$, boron, boron-containing compounds, aluminum, aluminum-containing compounds, and metal oxides such as thorium oxide, yttrium oxide, lanthanum oxide, and cerium oxide. Many of these metal-containing sintering aids are described in Negita, "Effective Sintering Aids for Silicon Carbide Ceramics: Reactivities of Silicon Carbide with Various Additives," 69 J. Am. Ceram. Soc. C-308 (1986). Other metal-containing sintering aids suggested by Negita might also be effective in the practice of this invention. Preferred sintering aids are selected from the group consisting of boron, boron-containing compounds, aluminum, and aluminum-containing compounds. Examples of boron-containing sintering aids include boron carbide, lithium borohydride, trivinylboron, triphenylboron, silicon hexaboride, $H_3BO_3$, $B_2O_3$, and the like. Examples of aluminum-containing sintering aids include aluminum oxide, aluminum nitride, aluminum diboride, and the like. The most preferred sintering aids are boron and boron carbide. Mixtures of sintering aids may also be used.

The compositions of the invention also include silicon carbide powders. Many of these materials are commercially available and well known in the art. Both alpha-SiC and beta-SiC powders, as well as mixtures, can be used. Generally, SiC powders with an average particle size of less than ten microns are preferred; powders with an average particle size of less than one micron are more preferred.

The compositions of this invention also contain curing agents which are used to crosslink the borosiloxane prior to sintering. The green bodies produced thereby generally have higher strengths than the uncured articles and, thus, can better withstand any handling or machining processes prior to sintering. These curing agents are generally activated by heating the green body containing the curing agent to temperatures in the range of 50°-300° C.

Conventional curing agents which are useful in the present invention are well known in the art. Examples include organic peroxides such as dibenzoyl peroxide, bis-p-chlorobenzol peroxide, bis-2,4-dichlorobenzol peroxide, di-t-butyl peroxide, dicumyl peroxide, t-butyl perbenzoate, 2,5-bis(t-butylperoxy)-2,3-dimethylhexane and t-butyl peracetate; and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the borosiloxane. Therefore, the actual amount of the curing agent will depend on the activity of the actual agent used and the amount of borosiloxane present. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

In addition to the above curing agent, a room temperature crosslinking agent may also be included in the mixture to modify the cure characteristics. These agents can include, for example, polyfunctional silanes or siloxanes. The preferred crosslinking agents are siloxanes with Si-H functional bonds such as $Ph_2Si(OSiMe_2H)_2$ or $PhSi(OSiMe_2H)_3$.

The addition of other processing aids such as lubricants, deflocculants and dispersants is also within the scope of this invention. Examples of such compounds include stearic acid, mineral oil, paraffin, calcium stearate, aluminum stearate, succinic acid, succinimide, succinic anhydride or various commercial products such as Oloa 1200 ™.

Once the amounts of the various components have been determined, they are combined in a manner that assures a uniform and intimate mixture so that avoid areas of varying density throughout the sintered product are avoided. Uniform and intimate mixtures can be prepared by using conventional blending techniques such as grinding the various powders in either the dry or wet state or ultrasonic dispersion. Generally preferred is wet grinding where the various powders are mixed and ground with organic solvents and the solvent thereafter removed. Other mixing and grinding methods will be apparent to those skilled in the art.

The uniform and intimate mixture may then be formed into the desired shape. Preferably, the desired shape is formed under pressure using such methods as injection molding, uniaxial pressing, isopressing, extrusion, transfer molding, and the like.

The composition is preferably cured prior to its final shaping. Curing procedures are well known in the art. Generally, such curing can be carried out by heating the article to a temperature in the range of about 50° to 450° C., preferably in an inert atmosphere such as argon or nitrogen.

Once the final shape has been obtained, the article is sintered in an inert atmosphere and/or under vacuum to a temperature of 1900° C. or more. The preferred sintering temperature is about 1950° to 2200° C. with about 2070° C. being most preferred.

Although not wishing to be limited by theory, it is thought that the free carbon derived from the borosiloxane plays two different roles in the formation of highly densified sintered bodies. First, it helps remove oxygen present in the silicon carbide powder; and secondly, it apparently acts as an additional sintering aid. Silicon carbide powders often contain so called "free carbon." However, the "free carbon" present in the silicon carbide powder does not appear to be as active or effective as free carbon generated in situ from the borosiloxane. It is not clear whether the free carbon produced in situ is more active chemically or whether it is simply more evenly dispersed. In any event, when the free carbon value of the mixture (as defined earlier) is about 1.5 weight percent, sintered bodies with maximum densities are obtained.

So that those skilled in the art can better appreciate and understand the invention, the following examples are given. Unless otherwise indicated, all percentages are by weight. Throughout this specification "Me" represents a methyl group. "Ph" represents a phenyl group, "Vi" represents a vinyl group and "B" represents the boron content.

In the following examples, the analytical methods used were as follows:

Proton NMR spectra were recorded on either a Varian EM360 or EM390 spectrometer and the results presented herein in ppm; fourier transform IR spectra were recorded on a Nicolet 5 DX spectrometer. Gel permeation chromatography (GPC) data were obtained on a Waters GPC equipped with a model 600E systems controller, a model 490 UV and model 410 Differential Defractometer detectors; all values are relative to polystyrene. TMA data were recorded on a Du Pont 940 thermomechanical analyzer (TMA) interfaced to an Omnitherm 2066 Computer.

Carbon, hydrogen and nitrogen analysis were done on a Control Equipment Corporation 240-XA Elemental Analyzer. Oxygen analysis was done on a Leco Oxygen Analyzer equipped with an Oxygen Determinator 316 (Model 783700) and an Electrode Furnace EF100. Silicon and boron were determined by a fusion technique which consisted of converting the material to soluble forms of silicon and boron and analyzing the solute for total silicon or boron by atomic absorption spectrometry.

Compounding was done on a Brabender Plasticorder (Model PL-V151) equipped with roller blades. Test bars were formed on a Carver laboratory press (Fred S. Carver Inc., Summit, N.J.). Pyrolysis was carried out in an Astro graphite element tube furnace Model 1000-3060-FP12 equipped with an Eurotherm Controller/Programmer Model 822. The furnace was equipped with an Ircon Modeline Plus optical pyrometer to monitor the temperature above 900° C. Flex strengths (using the four-point bend technique) were determined on either a Model TTC or Model 8562 Instron instrument. Fired densities were measured by water immersion techniques according to ASTM C373-72. Machined test bars were prepared according to Mil. Std. 1942 (MR).

The SiC powder used was IBIDEN BETARUNDUM UF ™ silicon carbide which is a mixture of about 5 to 8% alpha-SiC and 92 to 95% beta-SiC. The boron used was amorphous boron powder from Cerac Inc. The Phenolic resin was obtained from Union Carbide.

EXAMPLE I

Preparation of Sintered Test Bars with $(PhSiO_{1.5})_{0.70}(BO_{1.5})_{0.05}(Me_2SiViO_{0.5})_{0.25}$ A. Polymer Synthesis 5.19 g (0.05 mole) of $B(OMe)_3$ was added to a stirred mixture of 138.6 g (0.70 mole) of $PhSi(OMe)_3$, 23.25 g (0.125 mole) of $(Me_2SiVi)_2O$, 40.5 g (2.25 mole) of distilled water and 0.20 mL of $CF_3SO_3H$. The reaction was refluxed for three hours and then the methanol and water removed by distillation until the distillate temperature reached >90° C. The reaction was cooled and 0.541 g of $NaHCO_3$ and 115 g of toluene added. The toluene solution was refluxed and the water removed in a Dean-Stark trap. When the distillate was clear (ca. 3-4 hours), the reaction was cooled and 1 mL of Me$_2$SiViCl added. After stirring for 48 hours, the reaction was filtered and the filtrate concentrated in vacuo. Yield=105.1 g (91.2). $^1$H NMR (CDCl3) d −0.40-0.30 (SiMe$_2$, broad overlapping singlets), 5.36-6.03 (Si—Vi, broad multiplet), 6.67-7.9 (Si—Vi, broad singlet): calculated mole ratio of SiPh/Si—Vi/SiMe$_2$=0.70/0.25/0.25, found 3.22/1.00/1.05. IR (thin film on KBr disc); cm$^{-1}$ (intensity): 3073 (w), 3051 (w), 2959 (w), 1594 (w), 1430 (m), 1406 (w), 1361 (w), 1255 (m), 1134 (s), 1060 (s). 957 (w), 855 (m), 787 (m), 739 (m), 697 (m). B in polymer: calculated 0.47%, found 0.53±0.05%. The TMA softening point (Tg) of the resin was 23.4° C. GPC molecular weight (THF, polystyrene standard): Mw=2330, Mn=795. The silanol content of the polymer was 0.97%.

B. Polymer Pyrolysis and Char Composition Calculations

A blend of 14.79 g of the resin produced in part A, 2.64 g of Ph$_2$Si(OSiMe$_2$H)$_2$ and 0.81 g of Lupersol 101 (bis(t-butyl peroxy-2,5-dimethylhexane)) was prepared. An aliquot of the blend was crosslinked at 200° C. for 3 hours in an argon atmosphere. An aliquot of the crosslinked polymer was weighted into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 40.0%. The elemental composition of the char was 47.3% carbon, 0.6% boron and 45.6% silicon. The following calculation was made based upon the carbon and boron analyses: 100 g of cured polymer gives 40.0 g of a ceramic char consisting of 52.1% (by difference) silicon, 47.3% carbon and 0.6% boron. The char consists of 29.8 g of SiC (74.4%), 0.20 g B (0.5%) and 10.0 g of excess C (25.0%). Therefore, every gram of polymer gives 0.298 g of SiC, 0.002 g of B and 0.10 g of excess carbon.

C. Test Bar Fabrication and Testing 1) 25.02 g of SiC powder was ultrasonically dispersed in a toluene solution of 3.71 g of the resin produced in part A, 0.65 g of Ph$_2$Si(OSiMe$_2$H)$_2$ and 0.20 g of Lupersol 101 (FCV=1.4%, [B]=0.028%). The solvent was removed in vacuo. The residue was ground and passed through a 125 micron sieve. The sieved powder was uniaxially pressed into 35×8×ca. 3 mm test bars at 47 ksi. The test bars were cured for 3 hours at 200° C. in an argon atmosphere (room temperature to 200° C. at 3° C./minute). The density of the cured test bars averaged 2.17±0.01 g/cm$^3$ (n=6). The average 4-pt MOR flexural strength of the cured test bars was 5475±460 psi. Aliquots of the cured test bars were fired to 2100° C. using a temperature program of 15° C./minute from room temperature to 2100° C. with 30 minute holds at 1400° and 2100° C. The density of the fired test bars averaged 2.37±0.03 g/cm$^3$. The test bars were warped.

2) 35.00 g of SiC powder and 0.20 g of amorphous boron were ultrasonically dispersed into a toluene solution of 3.71 g of the resin formed in part A, 0.654 g of Ph$_2$Si(OSiMe$_2$H)$_2$ and 0.204 g of Lupersol 101 (FCV=1.0%, [B]=0.57%). The solvent was removed in vacuo. The residue was ground and passed through a 106 micron sieve. The sieved powder was uniaxially pressed into 35×8×ca. 3 mm test bars at 47 ksi. The test bars were cured for 3 hours at 200° C. in an argon atmosphere (room temperature to 200° C. at 3° C./minute). The density of the cured test bars averaged 2.17±0.018 g/cm$^3$ (n=4). The average 4-pt MOR flexural strength of the cured test bars was 2121±855 psi. Aliquots of the cured test bars were fired to 2100° C. using a temperature program of 15° C./minute from room temperature to 2100° C. with 30 minute holds at 1400° and 2100° C. The density of the fired test bars averaged 3.06±0.02 g/cm$^3$ and the average 4-pt MOR flexural strength was 47.2±4.3 ksi. The concentration of boron measured in the fired test bars was 0.51±0.05%.

The above example demonstrates that a combination of a borosiloxane and an amorphous boron powder can be used when insufficient boron exists in the borosiloxane polymer.

EXAMPLE II

Preparation of Sintered Test Bars with (PhSiO$_{1.5}$)$_{0.60}$(BO$_{1.5}$)$_{0.20}$(Me$_2$SiViO$_{0.5}$)$_{0.20}$

A. Polymer Synthesis 20.76 g (0.20 mole) of B(OMe)$_3$ was added to a stirred mixture of 118.8 g (0.60 mole) of PhSi(OMe)$_3$, 18.6 g (0.10 mole) of (Me$_2$SiVi)$_2$O, 46.8 g (2.6 mole) of distilled water and 0.35 g of CF$_3$SO$_3$H. The reaction was refluxed for three hours and then the methanol and water removed by distillation until the distillate temperature reached >90° C. The reaction was cooled and 0.555 g of NaHCO$_3$ and 103.7 g of toluene added. The toluene solution was refluxed and the water removed in a Dean-Stark trap. When the distillate was clear (ca. 3-4 hours), the reaction was cooled and 1 mL of Me$_2$SiViCl added. After stirring for 16 hours, the reaction was filtered and the filtrate concentrated in vacuo. Yield=85.1 g (82.7%). $^1$H NMR (CDCl3) d −0.32-0.45 (SiMe$_2$, broad overlapping singlets), 5.42-5.95 (Si—Vi, broad multiplet), 6.38-7.98 (Si—Ph, broad singlet): calculated mole ratio of SiPh/Si—Vi/SiMe$_2$=3.0/1.0/1.0, found 4.06/1.00/1.19. IR thin film, KBr disc); cm$^{-1}$ (intensity): 3072 (w), 3052 (w), 3015 (w), 2963 (w), 1958 (w), 1888 (w), 1821 (w), 1821 (w), 1659 (w), 1595 (w), 1489 (w), 1430 (m), 1408 (m), 1261 (s), 1082 (vs), 962 (m), 844 (m), 803 (s), 742 (m), 718 (m), 699 (m). The TMA softening point (Tg) of the resin was 90.9° C. GPC molecular weight (THF, polystyrene standard): Mw=890, Mn=365. The silanol content of the polymer was 0.93%. B in polymer: calculated 2.1%, found 1.74±0.05%.

B. Polymer Pyrolysis and Char Composition Calculations

A blend of 14.84 g of the resin formed in part A, 2.64 g of Ph$_2$Si(OSiMe$_2$H)$_2$ and 0.852 g of Lupersol 101 was prepared. An aliquot of the blend was crosslinked at 200° C. for 3 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 36.8%. The elemental composition of the char was 49.9% carbon, 3.2% boron and 45.8% silicon. The following calculation was made based upon the carbon and boron analyses: 100 g of cured polymer gives 36.8 g of a ceramic char consisting of 46.9% (by difference) silicon, 49.9% carbon and 3.2% boron. The char consists of 24.7 g of SiC (67.0%), 1.2 g B (3.3%) and 10.9 g of excess C (29.6%). Therefore, every gram of polymer gives 0.257 g of SiC, 0.012 g of B and 0.109 g of excess carbon.

C. Test Bar Fabrication and Testing 35.03 g of SiC powder was ultrasonically dispersed into a toluene solution of 3.71 g of the resin formed in part A, 0.655 g of $Ph_2Si(OSiMe_2H)_2$ and 0.210 g of Lupersol 101 (FCV=1.11%, [B]=0.12%). The solvent was removed in vacuo. The residue was ground and passed through a 106 micron sieve. The sieved powder was uniaxially pressed into $35 \times 8 \times$ ca. 3 mm test bars at 47 ksi. The test bars were cured for 3 hours at 200° C. in an argon atmosphere (room temperature to 200° C. at 3° C./minute). The density of the cured test bars averaged $2.17 \pm 0.01$ g/cm$^3$ (n=6). The average 4-pt MOR flexural strength of the cured test bars was $2506 \pm 592$ psi. Aliquots of the cured test bars were fired to 2100° C. using a temperature program of 15° C./minute from room temperature to 2100° C. with 30 minute holds at 1400° and 2100° C. The density of the fired test bars averaged $3.06 \pm 0.01$ g/cm$^3$ and had an average 4-pt MOR flexural strength of $78.0 \pm 8.5$ ksi (n=8).

EXAMPLE III

Preparation of Sintered test bars with $(PhSiO_{1.5})_{0.20}(BO_{1.5})_{0.40}(Ph_2SiO)_{0.20}(Me_2SiViO_{0.5})_{0.20}$

A. Polymer Synthesis 41.52 g (0.40 mole) of $B(OMe)_3$ was added to a stirred mixture of 39.6 g (0.20 mole) of $PhSi(OMe)_3$, 23.25 g (0.125 mole) of $(Me_2SiVi)_2O$, 48.8 g (0.20 mole) of $Ph_2Si(OMe)_2$, 46.8 g (2.6 mole) of distilled water and 0.200 mL of $CF_3SO_3H$. The reaction was refluxed for two hours and then stirred at room temperature for 12 hours. The methanol and water were removed by distillation until the distillate temperature reached >90. The reaction was cooled and 0.56 g of $NaHCO_3$ and 115 g of toluene added. The toluene solution was refluxed and the water removed in a Dean-Stark trap. When the distillate was clear (ca. 3-4 hours), the reaction was cooled and 1 mL of $Me_2SiViCl$ added. After stirring for 0.5 hours, the reaction was filtered and the filtrate concentrated in vacuo. Yield=90.75 g (92.7%). $^1$H NMR (CDCl3) d −0.18-0.33 (SiMe2, broad overlapping singlets), 5.49-5.96 (Si—Vi, broad multiplet), 6.69-7.89 (Si—Ph, broad singlet): calculated mole ratio of SiPh-/Si—Vi/SiMe2=3.0/1.0/1.0, found 2.86/1.00/1.07. B in polymer: calculated 4.15%, found $3.61 \pm 0.05$%. IR (thin film, KBr disc); cm$^{-1}$ (intensity): 3220 (m), 3072 (w), 3051 (w), 2959 (w), 2256 (w), 1959 (w), 1890 (w), 1822 (w), 1593 (w), 1569 (w), 1430 (m), 1352 (m), 1256 (s), 1192 (m), 1129 (s), 1069 (vs), 998 (m), 957 (m), 837 (m), 787 (s), 741 (m), 719 (m), 698 (m). The silanol content of the polymer was 3.60%. The vinyl content was 6.19%.

B. Polymer Pyrolysis and Char Composition Calculations

A blend of 6.07 g of the resin formed in part A, 1.20 g of $Ph_2Si(OSiMe_2H)_2$ and 0.23 g of Lupersol 101 was prepared. An aliquot of the blend was crosslinked at 200° C. for 3 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a char yield of 26.3%. The elemental composition of the char was 48.7% carbon, 5.0% boron and 41.2% silicon. The following calculation was made based upon the carbon and boron analyses: 100 g of cured polymer gives 26.3 g of a ceramic char consisting of 46.3% (by difference) silicon, 48.7% carbon and 5.0% boron. The char consists of 17.4 g of SiC (66.1%), 1.3 g B (4.9%) and 7.6 g of excess C (28.9%). Therefore, every gram of polymer gives 0.174 g of SiC, 0.013 g of B and 0.076 g of excess carbon.

C. Test Bar Fabrication and Testing 35.01 g of SiC powder was ultrasonically dispersed into a toluene solution of 3.71 g of the resin formed in part A, 0.656 g of $Ph_2Si(OSiMe_2H)_2$ and 0.206 g of Lupersol 101 (FCV=0.78%, [B]=0.13%). The solvent was removed in vacuo. The residue was ground and passed through a 106 micron sieve. The sieved powder was uniaxially pressed into $35 \times 8 \times$ ca. 3 mm test bars at 47 ksi. The test bars were cured for 3 hours at 200° C. in an argon atmosphere (room temperature to 200° C. at 3° C./minute). The density of the cured test bars averaged $2.23 \pm 0.01$ g/cm$^3$ (n=6). The average 4-pt MOR flexural strength of the cured test bars was $1733 \pm 501$ psi. Aliquots of the cured test bars were fired to 2100° C. using a temperature program of 15° C./minute from room temperature to 2100° C. with 30 minute holds at 1400° and 2100° C. The density of the fired test bars averaged $3.14 \pm 0.01$ g/cm$^3$. The average 4-pt MOR flexural strength of machined test bars was $74.1 \pm 8.5$ ksi (n=10). The crystalline SiC phase was 80% beta and 20% alpha.

EXAMPLE IV

Preparation of Sintered Test Bars with $(PhSiO_{1.5})_{0.65}(BO_{1.5})_{0.10}(Me_2SiViO_{0.5})_{0.25}$ and $(PhSiO_{1.5})_{0.20}(BO_{1.5})_{0.40}(Ph_2SiO)_{0.20}(Me_2SiViO_{0.5})_{0.20}$

A. Polymer Synthesis 1) 10.38 g (0.10 mole) of $B(OMe)_3$ was added to a stirred mixture of 128.7 g (0.65 mole) of $PhSi(OMe)_3$, 23.25 g (0.125 mole) of $(Me_2SiVi)_2O$, 40.5 g (2.3 mole) of distilled water and 0.200 mL of $CF_3SO_3H$. The reaction was refluxed for three hours and then the methanol and water removed by distillation until the distillate temperature reached >90° C. The reaction was cooled and 0.576 g of $NaHCO_3$ and 101 g of toluene added. The toluene solution was refluxed and the water removed in a Dean-Stark trap. When the distillate was clear (ca. 3-4 hours), the reaction was cooled and 1 mL of $Me_2SiViCl$ added. After stirring for 0.5 hour, the reaction was filtered and the filtrate concentrated in vacuo. Yield=98 g (88.6%). $^1$H NMR (CDCl3) d −0.40-0.27 (SiMe2, broad overlapping singlets), 5.27-5.90 (Si—Vi, broad multiplet), 6.50-7.70 (Si—Ph, broad singlet): calculated mole ratio of SiPh/Si—Vi/SiMe2=2.6/1.0/1.0, found 2.97/1.01/1.00. B in polymer: calculated 0.98%, found $0.80 \pm 0.05$%. IR (thin film, KBr disc); cm$^{-1}$ (intensity): 3618 (w), 3074 (w), 3051 (w), 3008 (w), 2958 (w), 1890 (w), 1824 (w), 1595 (w), 1490 (w), 1430 (m), 1406 (m), 1361 (m), 1255 (m), 1135 (s), 1065 (vs), 999 (m), 958 (m), 837 (s), 788 (s), 740 (m), 698 (m). The TMA softening point (Tg) of the resin was 23.8° C.

GPC molecular weight (THF, polystyrene standard): Mw=889, Mn=463. The silanol content of the polymer was 1.47%.

B. Polymer Pyrolysis and Char Composition Calculations

A blend of 7.42 g of the resin formed in part A, 1.33 g of $Ph_2Si(OSiMe_2H)_2$ and 0.42 g of Lupersol 101 was prepared. An aliquot of the blend was crosslinked at 200° C. for 3 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a char yield of 38.0%. The elemental composition of the char was 52.8% carbon, 1.0% boron and 46.6% silicon. The following calculation was made based upon the carbon and boron analyses: 100 g of cured polymer gives 38.0 g of a ceramic char consisting of 46.2% (by difference) silicon, 52.8% carbon and 1.0% boron. The char consists of 25.1 g of SiC (66.0%), 0.38 g B (0.10%) and 12.5 g of excess C (32.9%). Therefore, every gram of polymer gives 0.251 g of SiC, 0.004 g of B and 0.125 g of excess carbon.

C. Test Bar Fabrication and Testing 1) 35.00 g of SiC powder was ultrasonically dispersed into a toluene solution of 3.71 g of the resin formed in part A, 0.654 g of $Ph_2Si(OSiMe_2H)_2$ and 0.207 g of Lupersol 101 (FCV=1.27%, [B]=0.04%). The solvent was removed in vacuo. The residue was ground and passed through a 106 micron sieve. The sieved powder was uniaxially pressed into 35×8×ca. 3 mm test bars at 47 ksi. The test bars were cured for 3 hours at 200° C. in an argon atmosphere (room temperature to 200° C. at 3° C./minute). The density of the cured test bars averaged 2.17±0.01 g/cm$^3$ (n=6). The average 4-pt MOR flexural strength of the cured test bars was 5701±744 psi. Based upon the boron concentration in the polymer, the B in the mix was 0.075%. Aliquots of the cured test bars were fired to 2100° C. using a temperature program of 15° C./minute from room temperature to 2100° C. with 30 minute holds at 1400° and 2100° C. The density of the fired test bars averaged 2.56±0.01 g/cm$^3$. The low fired density was a result of insufficient boron in the fired test bars.

2) 35.00 g of SiC powder was ultrasonically dispersed into a toluene solution of 1.86 g of the resin prepared in Example III (part A), 1.86 g of the resin prepared in Example IV (part A), 0.665 g of $Ph_2Si(OSiMe_2H)_2$ and 0.201 g of Lupersol 101 (FCV=1.03%, [B]=0.087%). The solvent was removed in vacuo. The residue was ground and passed through a 90 micron sieve. The sieved powder was uniaxially pressed into 35×8×ca. 3 mm test bars at 47 ksi. The test bars were cured for 2 hours at 250° C. in an argon atmosphere (room temperature to 250° C. at 4° C./minute). The density of the cured test bars averaged 2.29±0.01 g/cm$^3$ (n=6). The average 4-pt MOR flexural strength of the cured test bars was 2807±789 psi. Based upon the boron concentration in the polymers, the B in the mix was 0.21%. Aliquots of the cured test bars were fired to 2100° C. using a temperature program of 15° C./minute from room temperature to 2100° C. with 30 minute holds at 1400° and 2100° C. The density of the fired test bars averaged 3.14±0.01 g/cm$_3$ (n=15). The average 4-pt MOR flexural strength of machined test bars was 77.2±8.5 ksi (n=10). The crystalline SiC phase in the fired test bars was 87% beta and 13% alpha. The B found in the fired test bars was 0.21±0.05%.

The above example demonstrates that it is possible to blend two different borosiloxane polymers together to achieve the boron concentration necessary for sintering.

EXAMPLE V

Preparation of Sintered test bars with $(PhSiO_{1.5})_{0.60}(BO_{1.5})_{0.20}(Me_2SiViO_{0.5})_{0.20}$: Comparison of Acid and Base Catalyzed Polymer Equilibrations

A. Polymer Synthesis

1) A toluene solution of 20.8 g (0.20 mole) of $B(OMe)_3$, 96 g of the siloxane resin prepared in Example I (part A) and 0.20 mL of $CF_3SO_3H$ was refluxed for 6 hours. The reaction was cooled to room temperature and allowed to stir overnight. 5.0 mL of distilled water was then added and the methanol removed by distillation. When all of the methanol had distilled, the reaction was cooled and 0.78 g of $NaHCO_3$ was added followed by 11.0 mL of a 3% solution of KOH in distilled water. The reaction was refluxed and the water removed in a Dean-Stark trap. When the distillate was clear, the reaction was cooled to room temperature and quenched with 1.0 mL of $Me_2ViSiCl$. After stirring for one hour, the reaction was filtered through a 0.2 micron membrane filter. Concentration of the filtrate in vacuo gave 91.6 g of a resin (88.9% yield). The resin had a TMA softening point (Tg) of 67° C. $^1$H NMR (CDCl3) d -0.16–0.33 (SiMe$_2$, broad overlapping singlets), 5.68–5.98 (Si-Vi, broad multiplet), 6.71–7.88 (Si-Ph, broad singlet): calculated mole ratio of SiPh/Si-Vi/SiMe$_2$=3.0/1.0/1.0, found 2.96/1.00/2.5. B in polymer: calculated 2.1%, found 0.67±0.05%. IR (thin film, KBr disc); cm$^{-1}$ (intensity): 3217 (w), 3073 (w), 3051 (w), 2961 (w), 1594 (w), 1430 (m), 1407 (w), 1259 (m), 1133 (s), 1056 (s), 998 (m), 957 (m), 839 (m), 804 (m), 788 (s), 729 (m), 697 (m).

2) A solution of 20.8 g (0.20 mole) of $B(OMe)_3$, 96 g of the siloxane resin prepared in Example I (part A) and 0.20 mL of $CF_3SO_3H$ in 114 g of toluene was refluxed for 4 hours. The solution was cooled to room temperature and 7.0 mL of distilled water added. After stirring for 2 hours, the methanol was removed by distillation (pot temperature reached 100° C.). The residual water was removed by azeotropic distillation. The solution was cooled and 1.2 g of $NaHCO_3$ and 1.0 mL of $Me_2ViSiCl$ were added. After stirring for several hours, the solution was filtered through a 0.2 micron membrane filter. Concentration of the filtrate in vacuo gave a resin with a silanol content of 2.82% and a B of 1.61%. IR (thin film, KBr disc); cm$^{-1}$ (intensity): 3140 (w), 3075 (w), 3053 (w), 3008 (w), 2963 (m), 11957 (w), 1889 (w), 1821 (w), 1595 (m), 1481 (m), 1430 (s), 1378 (s), 1261 (m), 1136 (s), 1056 (s), 998 (m), 883 (m), 842 (m), 805 (m), 730 (m), 697 (m). GPC molecular weight (THF, relative to polystyrene): Mw=2771, Mn=544.

B. Polymer Pyrolysis and Char Composition Calculations

1) A blend of 3.72 g of the resin from Example V (part A-1), 0.688 g of $Ph_2Si(OSiMe_2H)_2$ and 0.208 g of Lupersol 101 was prepared. An aliquot of the blend was crosslinked at 250° C. for 2 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 38.4%. The elemental composition of the char was 51.3% carbon, 1.0% boron and 46.7% silicon. The following calculation was made based upon the carbon and boron analyses: 100 g of cured polymer gives 38.4 g of a ceramic char consisting of 47.7% (by difference) silicon, 51.3% carbon and 1.0% boron. The char consists of 26.2 g of SiC (68.1%), 0.40 g B (1.0%) and 11.8 g of excess C (30.7%). Therefore, every gram of polymer gives 0.262 g of SiC, 0.004 g of B and 0.118 g of excess carbon.

2) A blend of 7.43 g of the resin from Example V (part A-2), 1.315 g of $Ph_2Si(OSiMe_2H)_2$ and 0.416 g of Lupersol 101 was prepared. An aliquot of the blend was crosslinked at 250° C. for 2 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 37.9%. The elemental composition of the char was 48.1% carbon, 2.02% boron and 49.2% silicon. The following calculation was made based upon the carbon and boron analyses: 100 g of cured polymer gives 37.9 g of a ceramic char consisting of 49.9% (by difference) silicon, 48.1% carbon and 2.02% boron. The char consists of 27.01 g of SiC (71.3%), 0.77 g B (2.0%) and 10.13 g of excess C (26.7%). Therefore, every gram of polymer gives 0.270 g of SiC, 0.008 g of B and 0.101 g of excess carbon.

C. Test Bar Fabrication and Testing 1) 35.0 g of SiC powder was ultrasonically dispersed into a toluene solution of 3.71 g of the resin formed in V A-1, 0.65 g of $Ph_2Si(OSiMe_2H)_2$ and 0.20 g of Lupersol 101 (FCV=1.2%, [B]=0.04%). The solvent was removed in vacuo. The residue was ground and passed through a 106 micron sieve. The sieved powder was uniaxially pressed into 35×8×ca. 3 mm test bars at 47 ksi. The test bars were cured for 2 hours at 250° C. in an argon atmosphere (room temperature to 250° C. at 4° C./minute). The density of the cured test bars averaged 2.25±0.03 g/cm³ (n=6). The average 4-pt MOR flexural strength of the cured test bars was 5635±655 psi. Aliquots of the cured test bars were fired to 2100° C. using a temperature program of 15° C./minute from room temperature to 2100° C. with 30 minute holds at 1400° and 2100° C. The density of the fired test bars averaged 2.43±0.05 g/cm³.

2) 35.0 g of SiC powder was ultrasonically dispersed into a toluene solution of 3.703 g of the resin formed in V A-2, 0.654 g of $Ph_2Si(OSiMe_2H)_2$ and 0.210 g of Lupersol 101 (FCV=1.03%, [B]=0.08%). The solvent was removed in vacuo. The residue was ground and passed through a 106 micron sieve. The sieved powder was uniaxially pressed into 35×8×ca. 3 mm test bars at 47 ksi. The test bars were cured for 2 hours at 250° C. in an argon atmosphere (room temperature to 250° C. at 4° C./minute). The density of the cured test bars averaged 2.24±0.01 g/cm³ (n=6). The average 4-pt MOR flexural strength of the cured test bars was 3883±421 psi. Aliquots of the cured test bars were fired to 2100° C. using a temperature program of 15° C./minute from room temperature to 2100° C. with 30 minute holds at 1400° and 2100° C. The density of the fired test bars averaged 2.93±0.07 g/cm³.

The above example demonstrates that the when boron is incorporated into a polymer by an equilibration method, it is preferred to use acid catalysis.

EXAMPLE VI

Preparation of Sintered test bars Using a Mixture of a Polyborosiloxane and an Alternate Carbon Source A. Polymer Synthesis A mixture of 48.8 g (0.20 mole) of $Ph_2Si(OMe)_2$, 39.6 g (0.20 mole) of $PhSi(OMe)_3$, 41.5 g (0.40 mole) of $B(OMe)_3$, 23.25 g (0.10 mole) of $(Me_2SiVi)_2O$, 46.8 g of distilled water and 0.20 mL of $CF_3SO_3H$ was refluxed for 3 hours and then the volatiles removed by distillation until the distillate temperature was 91° C. The reaction was cooled and 223 g of toluene was added. The reaction flask was fitted with a Dean-Stark trap and the reaction refluxed until all of the water was removed. After cooling, 2.15 g of $NaHCO_3$ and 2.0 mL of $Me_2SiViCl$ was added. The reaction was stirred for ca. one hour and then filtered through a 0.22 micron membrane filter. Concentration of the filtrate gave 78.6 g (79.3%) of a translucent, light brown polymer. TMA softening point was 24.6° C. IR (thin film, KBr plate): 3219 (w), 3073 (w), 3053 (w), 3029 (w), 2965 (w), 2360 (w), 2341 (w), 1822 (w), 1594 (w), 1430 (s), 1379 (s), 1262 (m), 1135 (s), 1082 (s), 998 (w), 883 (m), 845 (m), 804 (m), 719 (m), 698 (m), 678 (m), 515 (m) cm$^{-1}$.

B. Polymer Pyrolysis

1) A blend of 2.84 g of the polymer formed in part A and 0.166 g of Lupersol 101 was prepared. The blend was crosslinked by heating the sample to 250° C. (room temperature to 250° C. at 4° C./minute) for two hours in an argon atmosphere. An aliquot of the cured blend was heated to 1900° C. (room temperature to 1900° C. at 15° C./minute) and held at 1900° C. for two hours in an argon atmosphere. A ceramic char was obtained in a 33.2% yield. The ceramic char had an elemental composition of 36.0% carbon, 55.9% silicon (by difference) and 8.1% boron. The following rule of mixture calculations were made: 100 g of polymer gives 33.2 g of a ceramic char consisting of 26.6 g of SiC (80.2%), 4.1 g of excess carbon (12.3%) and 2.5 g of B (7.5%). Therefore, every gram of polymer gives 0.266 g of SiC, 0.025 g of B and 0.034 g of excess carbon.

C. Test Bar Fabrication and Sintering 1) 35.0 g of SiC powder was ultrasonically dispersed in a toluene solution of 3.70 g of the resin formed in part A and 0.66 g of $(Me_2HSiO)_4Si$ for five minutes (FCV=0.34%, [B]=0.25%). The solvent was removed at reduced pressure. The residue was ground in a hardened alumina mortar and pestle and sieved through a 90 micron screen. The sieved powder was pressed into test bars at 47 ksi. After curing at 250° C. for 2 hours (room temperature to 250° C. at 4° C./minute) in an argon atmosphere, the test bars had a density of 2.11 g/cm³ and an average 4-pt MOR of 3034±263 psi. Aliquots of the cured test bars were fired to 2070° C.; room temperature to 300° C. at 2° C./minute in an argon atmosphere; 300°–1150° C. at 5° C./minute in an argon atmosphere; 1150°–1575° C. at 5° C./minute in a vacuum; a three hour hold at 1575° C. in a vacuum; 1575°–2070° C. at 5° C./minute in an argon atmosphere; one hour hold at 2070° C. in an argon atmosphere; 2070°–1100° C. at 3° C./minute in an argon atmosphere. The density of the fired test bars averaged 2.10 g/cm$^3$ (n=10).

2) 42.0 g of SiC powder was ultrasonically dispersed in a THF solution of 5.50 g of the resin formed in part A, 0.28 g of Lupersol 101 and 2.50 g of Phenolic resin for five minutes (FCV=3.28%, [B]=0.31%). The solvent was removed at reduced pressure. The residue was ground in a hardened alumina mortar and pestle and sieved through a 90 micron screen. The sieved powder was pressed into test bars at 47 ksi. After curing at 250° C. for 2 hours (room temperature to 250° C. at 4° C./minute) in an argon atmosphere, the test bars had a density of 2.09 g/cm$^3$ and an average 4-pt MOR of 2910±561 psi. Aliquots of the cured test bars were fired to 2070° C. room temperature to 300° C. at 2° C./minute in an argon atmosphere; 300°–1150° C. at 5° C./minute in an argon atmosphere; 1150°–1575° C. at 5° C./minute in a vacuum; a three hour hold at 1575° C. in a vacuum; 1575°–2070° C. at 5° C./minute in an argon atmosphere; one hour hold at 2070° C. in an argon atmosphere; 2070°–1000° C. at 3° C./minute in an argon atmosphere. The density of the fired test bars averaged 3.03 g/cm$^3$ (n=9).

The above two examples show that a second carbon source can be used with a borosiloxane resin which is deficient in the amount of carbon necessary for sintering.

EXAMPLE VII

Preparation of Sintered Test Bars from $(Ph_2SiO_{0.5})_{0.25}(PhSiO_{1.5})_{0.25}(BO_{1.5})_{0.30}(Me_2SiViO_{0.5})_{0.20}$ A. Polymer Synthesis (Reference 8452-76)

31.1 g (0.30 mole) of B(OMe)$_3$ was added to a stirring mixture of 49.58 g (0.25 mole) of PhSi(OMe)$_3$, 18.6 g (0.10 mole) of (Me$_2$SiVi)$_2$O, 61.0 g (0.25 mole) of Ph$_2$Si(OMe)$_2$, 46.8 g (2.6 mole) of distilled water and 0.200 mL of CF$_3$SO$_3$H. The reaction was refluxed for four hours. The methanol and water were then removed by distillation until the distillate temperature reached >90° C. The reaction was cooled and 0.56 g of NaHCO$_3$ and 250 g of toluene added. The toluene solution was refluxed and the water removed in a Dean-Stark trap. When the distillate was clear (ca. 3–4 hours), the reaction was cooled and then neutralized with 2.57 g of NaHCO$_3$. The mixture was stirred for 15 minutes and then 1.8 mL of Me$_2$SiViCl was added. The solution was stirred for an additional three hours and then filtered through a 0.22 micron membrane filter. The filtrate was concentrated in vacuo to yield the polymeric product. Yield=84.7 g (76.4%). B in polymer: calculated 2.93%, found 2.76±0.05%. IR (thin film, KBr disc); cm$^{-1}$ (intensity): 3074 (w), 3053 (w), 3028 (w), 2964 (w), 1957 (w), 1888 (w), 1822 (w), 1594 (w), 1495 (w), 1430 (s), 1379 (s), 1262 (m), 1190 (m), 1135 (s), 1082 (s), 998 (m), 844 (m), 804 (m), 719 (m), 698 (m). The silanol content of the polymer was 2.89%. The TMA softening point (Tg) was 39.9° C. GPC molecular weight (THF, polystyrene standard): Mw=661, Mn=174.

B. Polymer Pyrolysis and Char Composition Calculations

A blend of 7.41 g of the resin formed in part A, 1.329 g of Ph$_2$Si(OSiMe$_2$H)$_2$ and 0.411 g of Lupersol 101 was prepared. An aliquot of the blend was crosslinked at 250° C. for 2 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 34.5%. The elemental composition of the char was 48.6% carbon, 3.83% boron and 51.2% silicon. The following calculation was made based upon the carbon and boron analyses: 100 g of cured polymer gives 34.5 g of a ceramic char consisting of 47.6% (by difference) silicon, 48.6% carbon and 3.83% boron. The char consists of 23.5 g of SiC (67.0%), 1.3 g B (3.8%) and 9.8 g of excess C (28.4%). Therefore, every gram of polymer gives 0.235 g of SiC, 0.013 g of B and 0.098 g of excess carbon.

C. Test Bar Fabrication and Testing 35.0 g of SiC powder was ultrasonically dispersed into a toluene solution of 3.70 g of the resin formed in part A, 0.66 g of Ph$_2$Si(OSiMe$_2$H)$_2$ and 0.206 g of Lupersol 101 (FCV=1.0%, [B]=0.13%). The solvent was removed in vacuo. The residue was ground and passed through a 106 micron sieve. The sieved powder was uniaxially pressed into 35×8×ca. 3 mm test bars at 47 ksi. The test bars were cured for 3 hours at 250° C. in an argon atmosphere (room temperature to 250° C. at 4° C./minute). The density of the cured test bars averaged 2.19±0.01 g/cm$^3$ (n=6). The average 4-pt MOR flexural strength of the cured test bars was 2378±318 psi. Aliquots of the cured test bars were fired to 2070° C. using a temperature program of room temperature to 300° C. at 2° C./minute, 300°–1150° C. at 5° C./minute, 1150°–1575° C. at 5° C./minute in a vacuum, a three hour hold at 1575° C. in a vacuum, 1575°–2070° C. at 5° C./minute with a one hour hold at 2070° C. The samples were cooled from 2070° to 100° C. at 3° C./minute. The density of the fired test bars averaged 3.14±0.01 g/cm$^3$ (n=11).

EXAMPLE VIII

Preparation of Sintered Test Bars from $(Ph_2SiO_{0.5})_{0.54}(BO_{1.5})_{0.36}(Me_2SiViO_{0.5})_{0.10}$ A. Polymer Synthesis A mixture of 22.25 g (0.36 mole) of B(OH)$_3$, 18.6 g (0.10 mole) of (Me$_2$SiVi)$_2$O, 131.8 g (0.54 mole) of Ph$_2$Si(OMe)$_2$ and 0.200 mL of CF$_3$SO$_3$H in 200 mL of toluene was heated at 90° C. for three hours. The methanol was then removed by distillation. When most of the methanol had distilled, the pot temperature was increased to 120° C. and a portion of the toluene was collected. A total of 150.87 g of distillate was collected. The reaction was neutralized with 2.39 g of NaHCO$_3$. After stirring for 45 minutes, 7.80 g of Me$_2$SiViCl was added and the solution allowed to stir overnight. After filtering the reaction through a 0.22 micron membrane filter and concentrating the filtrate in vacuo, 116.6 g of a light brown resin was obtained. B in polymer: calculated 3.02%, found 2.30±0.05%. The silanol content of the polymer was 1.48%. GPC molecular weight (THF, polystyrene standard): Mw=233, Mn=111. $^1$H NMR (d8-toluene): -0.16-0.34 (overlapping s, Si-Me), 3.48 (center of broad singlet, Si-OMe), 5.71-6.04 (broad m, Si-Vi), 6.71-7.91 (broad m, Si-Ph). The calculated Si-Ph/Si-Vi/Si-OMe/Si-Me ratio is 1.08/0.1/0.0/0.1. Found 1.2/1.0/1.2/1.4.

B. Polymer Pyrolysis and Char Composition Calculations

A blend of 4.286 g of the resin formed in part A, 0.754 g of $Ph_2Si(OSiMe_2H)_2$ and 0.181 g of Lupersol 101 was prepared. An aliquot of the blend was crosslinked at 250° C. for 2 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 27.5%. The elemental composition of the char was 59.4% carbon, 3.47% boron and 40.4% silicon. The following calculation was made based upon the carbon and boron analyses: 100 g of cured polymer gives 27.5 g of a ceramic char consisting of 37.13% (by difference) silicon, 59.4% carbon and 3.47% boron. The char consists of 14.59 g of SiC (53.0%), 0.94 g B (3.4%) and 15.0 g of excess C (53.6%). Therefore, every gram of polymer gives 0.146 g of SiC, 0.0094 g of B and 0.015 g of excess carbon.

C. Test Bar Fabrication and Testing 35.0 g of SiC powder was ultrasonically dispersed into a toluene solution of 3.72 g of the resin formed in part A, 0.65 g of $Ph_2Si(OSiMe_2H)_2$ and 0.212 g of Lupersol 101 (FCV=0.155%, [B]=0.097%). The solvent was removed in vacuo. The residue was ground and passed through a 90 micron sieve. The sieved powder was uniaxially pressed into 35×8×ca. 3 mm test bars at 47 ksi. The test bars were cured for 3 hours at 250° C. in an argon atmosphere (room temperature to 250° C. at 4° C./minute). The density of the cured test bars averaged 2.21±0.02 g/cm$^3$ (n=6). The average 4-pt MOR flexural strength of the cured test bars was 1817±378 psi. Aliquots of the cured test bars were fired to 2070° C. using a temperature program of room temperature to 300° C. at 2° C./minute, 300°-1150° C. at 5° C./minute, 1150°-1575° C. at 5° C./minute in a vacuum, a three hour hold at 1575° C. in a vacuum, 1575°-2070° C. at 5° C./minute with a one hour hold at 2070° C. The samples were cooled from 2070° to 100° C. at 3° C./minute. The density of the fired test bars averaged 3.11±0.02 g/cm$^3$ (n=8). The average 4-pt MOR flexural strength for machined test bars was 55.2±5.2 ksi.

EXAMPLE IX

Preparation of Sintered Test Bars from $(Ph_2SiO_{0.5})_{0.24}(PhSiO_{1.5})_{0.20}(BO_{1.5})_{0.36}(Me_2SiViO_{0.5})_{0.20}$

A. Polymer Synthesis

A mixture of 88.8 g (1.44 mole) of $B(OH)_3$, 74.4 g (0.40 mole) of $(Me_2SiVi)_2O$, 234.4 g (0.96 mole) of $Ph_2Si(OMe)_2$, 158.6 g (0.80 mole) of $PhSi(OMe)_3$, 100 g of water and 0.41 ml of $CF_3SO_3H$ was refluxed for 17.5 hours. The methanol was then removed by distillation until the distillate temperature reached 90° C. The pot was cooled and diluted with 356 g of toluene. The distillation head was replaced with a Dean-Stark trap and the reaction refluxed for 16 hours. After cooling to room temperature, the reaction was neutralized with 7.1 g of $NaHCO_3$ and then quenched with 10 mL of $Me_2SiViCl$. The reaction was stirred for several hours at room temperature and then filtered through a 0.22 micron membrane filter. Concentration of the filtrate gave 283.8 g of a light yellow resin. $^1$H NMR (d8-toluene): -0.40-0.20 (overlapping s, Si-Me), 5.2-6.0 (broad m, Si-Vi), 6.4-7.7 (broad m, Si-Ph). The calculated Si-Ph/Si-Vi/Si-Me$_2$ ratio is 3.4/1.0/1.0. Found 3.88/1.06/1.0.

B. Polymer Pyrolysis and Char Composition Calculations

A blend of 4.08 g of the resin formed in part A, 0.78 g of $Ph_2Si(OSiMe_2H)_2$ and 0.18 g of Lupersol 101 was prepared. An aliquot of the blend was crosslinked at 250° C. for 2 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 29.4%. The elemental composition of the char was 52.5% carbon, 6.45% boron and 44.9% silicon. The following calculation was made based upon the carbon and boron analyses: 100 g of cured polymer gives 29.4 g of a ceramic char consisting of 41.1% (by difference) silicon, 52.5% carbon and 6.45% boron. The char consists of 17.24 g of SiC (58.6%), 1.88 g B (6.4%) and 10.22 g of excess C (34.8%). Therefore, every gram of polymer gives 0.172 g of SiC, 0.019 g of B and 0.102 g of excess carbon.

C. Test Bar Fabrication and Testing 35.2 g of SiC powder was ultrasonically dispersed into a toluene solution of 4.08 g of the resin formed in part A, 0.72 g of $Ph_2Si(OSiMe_2H)_2$ and 0.183 g of Lupersol 101 (FCV=1.14%, [B]=0.21%). The solvent was removed in vacuo. The residue was ground and passed through a 90 micron sieve. The sieved powder was uniaxially pressed into 35×8×ca. 3 mm test bars at 47 ksi. The test bars were cured for 2 hours at 250° C. in an argon atmosphere (room temperature to 250° C. at 3° C./minute). The density of the cured test bars averaged 2.23±0.02 g/cm$^3$ (n=6). The average 4-pt MOR flexural strength of the cured test bars was 2632±299 psi. Aliquots of the cured test bars were fired to 2070° C. using a temperature program of room temperature to 300° C. at 2° C./minute, 300°-1150° C. at 5° C./minute, 1150°-1575° at 5° C./minute in a vacuum, a three hour hold at 1575° C. in a vacuum, 1575°-2070° C. at 5° C./minute with a one hour hold at 2070° C. The samples were cooled from 2070° to 100° C. at 3° C./minute. The density of the fired test bars averaged 3.10±0.01 g/cm$^3$ (n=12). The average 4-pt MOR flexural strength for machined test bars was 65.72±10.5 ksi (n=24).

EXAMPLE X

Example of Transfer Molding
$(Ph_2SiO_{0.5})_{0.15}(PhSiO_{1.5})_{0.30}(BO_{1.5})_{0.10}(MeSiViO)_{0.45}$

A. Polymer Synthesis

A mixture of 10.3 g (0.10 mole) of $B(OMe)_3$, 38.7 g (0.45 equivalents) of $(MeViSiO)_n$, 36.6 g (0.15 mole) of $Ph_2Si(OMe)_2$, 59.5 g (0.30 mole) of $PhSi(OMe)_3$, 85 g of water and 0.50 mL of $CF_3SO_3H$ was refluxed for 4 hours. The reaction was then neutralized by addition of 1 g of $NaHCO_3$ and the methanol was removed by distillation until the distillate temperature reached 95° C. The pot was cooled and diluted with 100 g of toluene and 1 g of zinc octoate added. The distillation head was replaced with a Dean-Stark trap and the reaction refluxed for 24 hours. After cooling to room temperature, the reaction was quenched with 10 mL of $Me_2SiViCl$. The reaction was stirred for several hours at room temperature and then filtered through a 0.22 micron membrane filter. Concentration of the filtrate gave 86 g of a resin. GPC in THF showed a number average molecular weight of 475 and a weight average molecular weight of 1191.

B. Polymer Pyrolysis and Char Composition Calculations

A blend of 5.587 g of the resin formed in part A, 0.010 g of Lupersol 101 was prepared. An aliquot of the blend was crosslinked at 200° C. for 2 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 34.9%. The elemental composition of the char was 46.1% carbon, 1.76% boron and 50.5 % silicon. The following calculation was made based upon the carbon and boron analyses: 100 g of cured polymer gives 34.9 g of a ceramic char consisting of 52.2% (by difference) silicon, 46.1% carbon and 1.8% boron. The char consists of 26.0 g of SiC (74.5%), 0.628 g B (1.8%) and 8.28 g of excess C (23.7%). Therefore, every gram of polymer gives 0.26 g of SiC, 0.0063 g of B and 0.0828 g of excess carbon.

C. Test Bar Fabrication and Testing 30.0 g of the resin formed in part A, 0.045 g of Lupersol 101 and 95 g SiC powder (added in four portions 50.0 g, 25.0 g, 15.0 g and 5.0 g) were mixed at 110° C. in a Brabender plasticorder tester fitted with roller heads and a 60 mL bowl. The material was mixed for 45 minutes at speeds of 60 rpm and allowed to cool. The material was removed and molded employing a 12.5 ton Hull transfer molder at 180° C. platen temperature and 1000 psig transfer pressure. The material was molded into a 12 cavity H shaped mold in 5 minute cycles. The parts were removed after these cycles and were characterized by densities of 2.15 g/cc and 4 point MOR strengths of 5.45±1.74 ksi. Aliquots of the molded bodies were fired to 2050° C. using a temperature program of room temperature to 1200° C. at 2.5° C./minute, 1200°–1500° C. at 2.5° C./minute in a vacuum, a two hour hold at 1500° C. in a vacuum, 1500°–2050° C. at 2.5° C./minute with a four hour hold at 2050° C. The samples were cooled from 2070° to 100° C. at 5° C./minute. The density of the sintered bodies averaged 2.96±0.01 g/cm$^3$ (n=12). The average 4-pt MOR flexural strength for the test bars was 44.2±16.4 ksi (n=12).

EXAMPLE XI

Example of Transfer Molding
$(Ph_2SiO_{0.5})_{0.15}(PhSiO_{1.5})_{0.30}(BO_{1.5})_{0.10}(MeSiViO)_{0.30}(Me_2SiO)_{0.15}$

A. Polymer Synthesis

A mixture of 20.6 g (0.20 mole) of $B(OMe)_3$, 51.6 g (0.60 equivalents) of $(MeViSiO)_n$, 22.2 g (0.30 equivalents) of $(Me2SiO)_n$, 73.2 g (0.30 mole) of $Ph_2Si(OMe)_2$, 118.8 g (0.60 mole) of $PhSi(OMe)_3$, 170 g of water and 2.0 mL of $CF_3SO_3H$ was refluxed for 4 hours. The methanol was removed by distillation until the distillate temperature reached 95° C. The pot was cooled and diluted with 140 g of toluene added. The distillation head was replaced with a Dean-Stark trap and the reaction refluxed for 24 hours. After cooling to room temperature, the reaction was neutralized by addition of 1 g of $NaHCO_3$ and quenched with 10 mL of $Me_2SiViCl$. The reaction was stirred for several hours at room temperature and then filtered through a 0.22 micron membrane filter. Concentration of the filtrate gave 168 g of a resin.

B. Polymer Pyrolysis and Char Composition Calculations

A blend of 5.055 g of the resin formed in part A, 0.010 g of Lupersol 101 was prepared. An aliquot of the blend was crosslinked at 200° C. for 2 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 1900° C. at approximately 15° C./minute and held at temperature for 2 hours before cooling to room temperature. The sample had a mass retention of 37.6%. The elemental composition of the char was 49.6% carbon, 1.96% boron and 46.6% silicon. The following calculation was made based upon the carbon and boron analyses: 100 g of cured polymer gives 37.6 g of a ceramic char consisting of 48.4% (by difference) silicon, 49.6% carbon and 1.96% boron. The char consists of 25.9 g of SiC (69.1%), 0.737 g B (1.9%) and 10.85 g of excess C (28.9%). Therefore, every gram of polymer gives 0.26 g of SiC, 0.0074 g of B and 0.108 g of excess carbon.

C. Test Bar Fabrication and Testing 30.0 g of the resin formed in part A, 0.045 g of Lupersol 101 and 90.0 g SiC (added in four portions 50.0 g, 20.0 g, 15.0 g and 5.0 g) were mixed at 110° C. in a Brabender plasticorder tester fitted with roller heads and a 60 mL bowl. The material was mixed for 45 minutes at speeds of 60 rpm and allowed to cool. The material was removed and molded employing a 12.5 ton Hull transfer molder at 180° C. platen temperature and 1000 psig transfer pressure. The material was molded into a 12 cavity H shaped mold in 5 minute cycles. The parts were removed after these cycles and were characterized by densities of 2.15 g/cc and 4 point MOR strengths of 5.45±1.74 ksi. Aliquots of the molded bodies were fired to 2050° C. using a temperature program of room temperature to 1200° C. at 2.5° C./minute, 1200°–1500° C. at 2.5° C./minute in a vacuum, a two hour hold at 1500° C. in a vacuum, 1500°–2050° C. at 2.5° C./minute with a four hour hold at 2050° C. The samples were cooled from 2070° to 100° C. at 5° C./minute. The density of the sintered bodies averaged 2.89±0.02 g/cm$^3$ (n=12). The average 4-pt MOR flexural strength for the test bars was 49.6±4.5 ksi (n=12).

That which is claimed is:

1. A method of preparing a sintered body of silicon carbide, said method comprising:
   (a) blending components comprising silicon carbide powder, a preceramic borosiloxane, and an additive selected from the group consisting of crosslinking agents, crosslinking agent modifiers and mixtures thereof to a uniform mixture, where the additive is present in an effective amount to induce crosslinking, and where the amount of preceramic borosiloxane is such that (i) the amount of boron in the mixture is 0.08–3 weight percent based on the total weight of the silicon carbide powder and the char derived from the preceramic borosiloxane and (ii) the free carbon value of the mixture is greater than 0.1 weight percent based on the total weight, of the silicon carbide powder and the char derived from the preceramic borosiloxane;
   (b) forming the uniform mixture into the desired shape under pressure at a temperature less than about 500° C. to obtain a handleable green body; and
   (c) sintering the handleable green body in an inert atmosphere at a temperature greater than 1900° C. to obtain a sintered body of silicon carbide with a density greater than 2.4 g/cm$^3$.

2. The method of claim 1 wherein the boron content and the free carbon content of the char derived from the preceramic borosiloxane is determined, prior to forming a handleable green body, by heating a known amount of the preceramic borosiloxane containing an effective amount of the additive under an inert atmosphere to an elevated temperature for a time sufficient to convert the preceramic borosiloxane into a stable ceramic char material, determining the stable ceramic char yield and the silicon, carbon and boron content of the stable ceramic char material, and then calculating the amount of free carbon and boron in the stable ceramic char material per part of the preceramic borosiloxane.

3. The method of claim 2 wherein the crosslinking agent modifier is selected from the group consisting of polyfunctional silanes and polyfunctional siloxanes.

4. The method of claim 2 wherein additional sintering aids are blended into the uniform mixture in an amount such that the total weight of the boron derived from the borosiloxane plus the sintering aid is 0.08–3 weight percent based on the total weight of the silicon carbide powder and the char derived from the preceramic borosiloxane.

5. The method of claim 4 wherein the sintering aids are selected from the group consisting of boron, boron-containing compounds, aluminum, and aluminum-containing compounds.

6. The method of claim 2 wherein the preceramic borosiloxane is present at such a level that the free carbon value of the mixture is between 0.5 and 3.0 weight percent.

7. The method of claim 6 wherein the preceramic borosiloxane contains polymeric units selected from the group consisting of $RSiO_{1.5}$, $R_2SiO$, $R_3SiO_{0.5}$, $R_2BO_{0.5}$, RBO and $BO_{1.5}$, where each R is independently selected from the group consisting of hydrogen, alkyl radicals containing 1 to 20 carbon atoms, phenyl radicals, and vinyl radicals.

8. The method of claim 7 wherein the preceramic borosiloxane is present at such a level that the free carbon value of the mixture is between 1.0 and 2.0 weight percent.

9. The method of claim 8 wherein the handleable green body is sintered at a temperature of 2000° to 2200° C. to obtain a sintered body of silicon carbide with a density greater than 2.9 g/cm$^3$.

10. The method of claim 2 wherein the crosslinking agent is an organic peroxide and is present at 0.1 to 5.0 weight percent based on the weight of the borosiloxane.

11. The method of claim 2 wherein the crosslinking agent is a platinum-containing catalyst and is present at 1.0 to 1000 ppm based on the weight of the borosiloxane.

12. A method of forming a handleable green body comprising:
   (i) blending components comprising silicon carbide powder, a preceramic borosiloxane, and an additive selected from the group consisting of crosslinking agents, crosslinking agent modifiers and mixtures thereof to a uniform mixture, where the additive is present in an effective amount to induce crosslinking, and where the amount of preceramic borosiloxane is such that (a) the amount of boron in the mixture is 0.08–3 weight percent based on the total weight of the silicon carbide powder and the char derived from the preceramic borosiloxane and (b) the free carbon value of the mixture is greater than 0.1 weight percent based on the total weight of the silicon carbide powder and the char derived from the preceramic borosiloxane, and
   (ii) forming the uniform mixture into the desired shape under pressure at a temperature less than about 500° C.

13. The method of claim 12 wherein the boron content and the free carbon content of the char derived from the preceramic borosiloxane is determined, prior to forming a handleable green body, by heating a known amount of the preceramic borosiloxane containing an effective amount of the additive under an inert atmosphere to an elevated temperature for a time sufficient to convert the preceramic borosiloxane into a stable ceramic char material, determining the stable ceramic char yield and the silicon, carbon and boron content of the stable ceramic char material, and then calculating the amount of free carbon and boron in the stable ceramic char material per part of the preceramic borosiloxane.

14. The method of claim 13 wherein the crosslinking agent modifier is selected from the group consisting of polyfunctional silanes and polyfunctional siloxanes.

15. The method of claim 13 wherein additional sintering aids are blended into the uniform mixture in an amount such that the total weight of the boron derived from the borosiloxane plus the sintering aid is 0.08–3 weight percent based on the total weight of the silicon carbide powder and the char derived from the preceramic borosiloxane.

16. The method of claim 15 wherein the sintering aids are selected from the group consisting of boron, boron-containing compounds, aluminum, and aluminum-containing compounds.

17. The method of claim 13 wherein the preceramic borosiloxane is present at such a level that the free carbon value of the mixture is between 0.5 and 3.0 weight percent.

18. The method of claim 17 wherein the preceramic borosiloxane contains polymeric units selected from the group consisting of $RSiO_{1.5}$, $R_2SiO$, $R_3SiO_{0.5}$, $R_2BO_{0.5}$, RBO and $BO_{1.5}$, where each R is independently selected from the group consisting of hydrogen, alkyl radicals containing 1 to 20 carbon atoms, phenyl radicals, and vinyl radicals.

19. The method of claim 18 wherein the preceramic borosiloxane is present at such a level that the free carbon value of the mixture is between 1.0 and 2.0 weight percent.

20. The method of claim 13 wherein the crosslinking agent is an organic peroxide and is present at 0.1 to 5.0 weight percent based on the weight of the borosiloxane.

21. The method of claim 13 wherein the crosslinking agent is a platinum-containing catalyst and is present at 1.0 to 1000 ppm based on the weight of the borosiloxane.

22. A uniform mixture comprising silicon carbide powder, a preceramic borosiloxane, and an additive selected from the group consisting of crosslinking agents, crosslinking agent modifiers and mixtures thereof to a uniform mixture, where the additive is present in an effective amount to induce crosslinking, and where the amount of preceramic borosiloxane is such that (a) the amount of boron in the mixture is 0.08–3 weight percent based on the total weight of the silicon carbide powder and the char derived from the preceramic borosiloxane and (b) the free carbon value of the mixture is greater than 0.1 weight percent based on the total weight of the silicon carbide powder and the char derived from the preceramic borosiloxane.

23. The uniform mixture of claim 22 wherein the crosslinking agent modifier is selected from the group consisting of polyfunctional silanes and polyfunctional siloxanes.

24. The method of claim 22 wherein additional sintering aids are blended into the uniform mixture in an amount such that the total weight of the boron derived from the borosiloxane plus the sintering aid is 0.08–3 weight percent based on the total weight of the silicon carbide powder and the char derived from the preceramic borosiloxane.

25. The method of claim 23 wherein additional sintering aids are blended into the uniform mixture in an amount such that the total weight of the boron derived from the borosiloxane plus the sintering aid is 0.08–3 weight percent based on the total weight of the silicon carbide powder and the char derived from the preceramic borosiloxane.

26. The uniform mixture of claim 24 wherein the sintering aids are selected from the group consisting of boron, boron-containing compounds, aluminum, and aluminum-containing compounds.

27. The uniform mixture of claim 22 wherein the preceramic borosiloxane is present at such a level that the free carbon value of the mixture is between 0.5 and 3.0 weight percent.

28. The uniform mixture of claim 27 wherein the preceramic borosiloxane contains polymeric units selected from the group consisting of $RSiO_{1.5}$, $R_2SiO$, $R_3SiO_{0.5}$, $R_2BO_{0.5}$, RBO and $BO_{1.5}$, where each R is independently selected from the group consisting of hydrogen, alkyl radicals containing 1 to 20 carbon atoms, phenyl radicals, and vinyl radicals.

29. The uniform mixture of claim 28 wherein the preceramic borosiloxane is present at such a level that the free carbon value of the mixture is between 1.0 and 2.0 weight percent.

30. The uniform mixture of claim 22 wherein the crosslinking agent is an organic peroxide and is present at 0.1 to 5.0 weight percent based on the weight of the borosiloxane.

31. The uniform mixture of claim 22 wherein the crosslinking agent is a platinum-containing catalyst and is present at 1.0 to 1000 ppm based on the weight of the borosiloxane.

* * * * *